E. D. MILLER.
Fruit-Gatherer.
No. 59,857
Patented Nov. 20, 1866
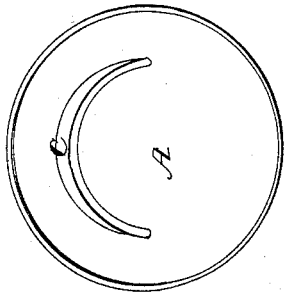
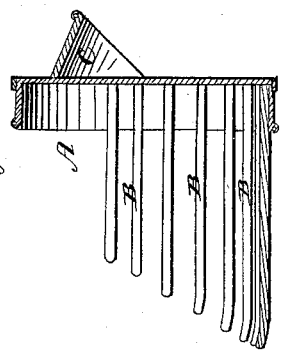
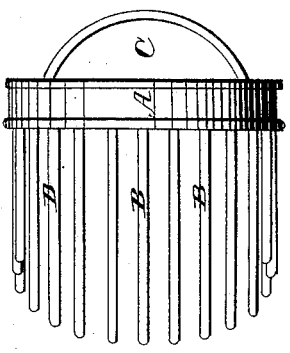
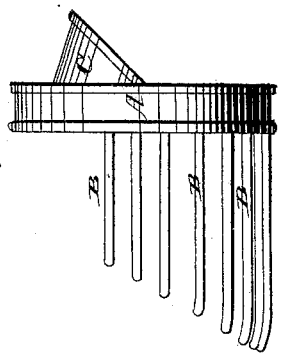
Witnesses
Samuel N. Piper
Geo. H. Andrews
Inventor.
E. D. Miller.
by his Attorney
R. H. Eddy.

United States Patent Office.

IMPROVEMENT IN CRANBERRY GATHERER.

ERASMUS D. MILLER, OF DORCHESTER, MASSACHUSETTS.

Letters Patent No. 59,857, dated November 20, 1866.

SPECIFICATION.

TO ALL PERSONS TO WHOM THESE PRESENTS SHALL COME:

Be it known that I, ERASMUS D. MILLER, of Dorchester, in the county of Norfolk, and State of Massachusetts, have invented an improved Cranberry Gatherer; and I do hereby declare the same to be fully described in the following specification, and represented in the accompanying drawings, of which—

Figure 1 is a top view.
Figure 2, a side elevation.
Figure 3, a longitudinal section; and
Figure 4, a rear end view of it.

This cranberry gatherer consists of a shallow cylindrical vessel or open box, A, and a series of wires, B B B, projecting from the inner periphery of the box, and arranged at equal, or about at equal, distances apart, and with their front ends back-sloped, that is, in or about in a plane sloping toward the upper part of the box in manner as represented. On the back of the box is a curved handle, $C_1$ under which the third and fourth fingers of a person's hand are placed, while the box is grasped in the hand, and the thumb rests on the rim of the box. In using the gatherer, it is to be pressed into the vines, after which the left hand of the operator is to be placed on the ends of the teeth so as to cover them; after which, and while the said hand covers the gatherer, the latter is to be tipped and drawn away from the vines to draw the fruit off from them and catch them in the box.

I am aware of the cranberry gatherers described in the United States patents numbered 46,760–48,136, and therefore I lay no claim to them. Mine is simpler in construction as well as in the arrangement of its parts, and besides is very efficient in operation.

I therefore claim my improved cranberry gatherer, made as hereinbefore described, that is, of a series of wires or teeth and a shallow cylindrical box, or the same and a handle arranged as specified, the front ends of the teeth under such arrangement being back-sloped, as set forth.

ERASMUS D. MILLER.

Witnesses:
R. H. EDDY,
F. P. HALE, JR.